US012680790B1

(12) United States Patent
Marcum

(10) Patent No.: US 12,680,790 B1
(45) Date of Patent: Jul. 14, 2026

(54) TACTICAL SHIELD HANDLE AND LIGHTING SYSTEM

(71) Applicant: Elzetta Design, LLC, Georgetown, KY (US)

(72) Inventor: Bryan Thomas Marcum, Georgetown, KY (US)

(73) Assignee: Elzetta Design, LLC, Georgetown, KY (US)

( * ) Notice: Subject to any disclaimer, the term of this patent is extended or adjusted under 35 U.S.C. 154(b) by 68 days.

(21) Appl. No.: 18/775,733

(22) Filed: Jul. 17, 2024

Related U.S. Application Data

(60) Provisional application No. 63/514,286, filed on Jul. 18, 2023.

(51) Int. Cl.
*F41H 5/08* (2006.01)
*F21V 33/00* (2006.01)
*F21Y 115/10* (2016.01)

(52) U.S. Cl.
CPC ........... *F41H 5/08* (2013.01); *F21V 33/0076* (2013.01); *F21Y 2115/10* (2016.08)

(58) Field of Classification Search
CPC ..... F41H 5/08; F21V 33/0076; F21Y 2115/10
USPC ........................................................ 89/36.07
See application file for complete search history.

(56) References Cited

U.S. PATENT DOCUMENTS 3,370,302 A * 2/1968 Karlyn ...................... F41H 5/08 2/2.5
5,083,515 A * 1/1992 Seksaria ................. F41H 5/013 109/81
6,220,916 B1 * 4/2001 Bart ....................... A63H 33/00 446/26
6,367,943 B1 * 4/2002 Tocci .................. F41H 13/0087 362/253
6,807,890 B1 * 10/2004 Fuqua ....................... F41H 5/08 89/36.02
10,288,387 B1 * 5/2019 Marcum ................... F41H 5/08
10,634,459 B1 * 4/2020 Marcum ................... F41H 5/08
2009/0284957 A1 * 11/2009 Shemwell ............... F41H 13/00 362/109
2014/0233235 A1 * 8/2014 Micarelli .................. F41H 5/08 362/253
2015/0233679 A1 * 8/2015 Seabrook ................ F41A 27/10 89/36.07
2018/0202771 A1 * 7/2018 Armellino, Jr. ........... F41H 5/08
2024/0093974 A1 * 3/2024 Taylor ..................... F41H 5/013

* cited by examiner

*Primary Examiner* — John Cooper
(74) *Attorney, Agent, or Firm* — Stites & Harbison, PLLC; David W. Nagle, Jr.

(57) ABSTRACT

A tactical shield handle and lighting system comprises: a handle assembly configured to be mounted on a rear surface of the tactical shield; and a lighting enclosure configured to be mounted on a front surface of the tactical shield, the lighting enclosure including one or more light sources. In use, the handle assembly is secured to the lighting enclosure through the tactical shield by one or more fastener subsystems. Each of the one or more fastener subsystems includes: a fastener post; a ballistic deflection cone mounted to a distal end of the fastener post; and a retaining spring positioned around an upper section of the fastener post and compressed between a flange section of the fastener post and the ballistic deflection cone.

20 Claims, 7 Drawing Sheets

TACTICAL SHIELD HANDLE AND LIGHTING SYSTEM

CROSS-REFERENCE TO RELATED APPLICATIONS

The present application claims priority to U.S. Patent Application Ser. No. 63/514,286 filed on Jul. 18, 2023, the entire disclosure of which is incorporated herein by reference.

BACKGROUND OF THE INVENTION

The present invention relates to tactical shields, and, more particularly, handles and lighting systems for such tactical shields.

In recent years, the increasing complexity of tactical operations, gear, and standards have generated the need for a level of lighting integration. As a result, a wide variety of lighting systems have been developed, most of which are designed to be retrofitted onto existing tactical shields. Some of these lighting systems utilize a mechanical pressure pad-style switch tethered to a wire harness, which is then affixed to the existing shield handle at a location chosen by the operator. Some of these systems also incorporate a light-emitting diode (LED) or array of LEDs mounted in some form of enclosure that is secured to the front of the shield. For instance, both the lighting enclosure and switch could be mounted using typical hook-and-loop style fasteners or other known fastening means. In addition, some lighting systems have been developed which are intended to be installed by the shield manufacturer, rather than retrofitted by the operator. In that case, the shields may be provided with pre-designed holes that accommodate bolts or similar fasteners for mounting the lighting enclosure to the front of the shield.

In such prior art constructions, however, off-the-shelf bolts or fasteners are often used to secure the lighting system to the shield and/or a handle on the rear surface of the shield. This can create a potential failure point, especially if the bolt or the adjacent area is struck by a round from a firearm.

U.S. Pat. Nos. 10,288,387 and 10,634,459, which are incorporated herein by reference, describe a construction for a tactical shield and handle and lighting system that is designed, in part, to protect an operator in the event that a round from a firearm strikes one of the bolts that connects a lighting enclosure to a handle assembly through the shield. Specifically, as described in U.S. Pat. Nos. 10,288,387 and 10,634,459, each bolt passes through a respective hole defined through the lighting enclosure, through the shield, and then into a respective threaded hole defined by attachment blocks of the handle assembly. Each of these attachment blocks has a wide flange for engaging the rear surface of the shield. Because each threaded hole is defined and enclosed within the respective attachment block, if the head of one of the bolts is struck by a round, the remaining threaded portion of the bolt cannot become a secondary projectile and strike the operator. Furthermore, if a round does not strike the head of one of the bolts, but somehow strikes another surface at an angle and "sneaks" through one of the holes cut into the shield for mounting the tactical shield handle and lighting system, the wide flange of each attachment block serves as a "backstop" and protects the operator.

Applicant has recognized, however, that additional measures may be warranted to improve the ballistic resistance of a tactical shield and protect an operator using the shield from a high-powered rifle round.

SUMMARY OF THE INVENTION

A tactical shield handle and lighting system for made in accordance with the present invention comprises: a handle assembly configured to be mounted on a rear surface of the tactical shield; and a lighting enclosure configured to be mounted on a front surface of the tactical shield, the lighting enclosure including one or more light sources. In use, the handle assembly is secured to the lighting enclosure through the tactical shield by one or more fastener subsystems. Each of the one or more fastener subsystems includes: a fastener post; a ballistic deflection cone mounted to a distal end of the fastener post; and a retaining spring positioned around an upper section of the fastener post and compressed between a flange section of the fastener post and the ballistic deflection cone.

Fastener posts are used to secure the lighting enclosure to the handle assembly through the shield. In some embodiments, the handle assembly includes an attachment block at each end of a central horizontal handle. Each of these attachment blocks has a threaded hole for receiving one of the fastener posts. Thus, each fastener post passes through a respective hole defined through the lighting enclosure, through the shield, and then into the respective threaded hole defined by the attachment blocks of the handle assembly.

Each fastener post is comprised of and can be characterized as including multiple discrete sections. In some embodiments, the fastener post has a lower section that includes a threaded end, which is configured to engage the threaded hole defined by one of the attachment blocks of the handle assembly. A penultimate section of the fastener post is configured to extend through the shield and has a larger diameter than the lower section. A flange section of the fastener post is configured to be positioned in front of the shield and has a significantly larger diameter as compared to the other sections of the fastener post. Finally, an upper section of the fastener post is configured to pass through the lighting enclosure and includes a threaded distal end.

A ballistic deflection cone is mounted to the distal end of the fastener post. In some embodiments, the ballistic deflection cone has internal threads that correspond to and mate with the distal threaded end of the upper section of the fastener post, so that the ballistic deflection cone can be screwed onto the upper section of the fastener post.

A retaining spring is positioned around the upper section of the fastener post and compressed between the flange section of the fastener post and the ballistic deflection cone.

In the event of a ballistic impact, the cone-shaped surface of the ballistic deflection cone is designed to deflect the round into the more energy-absorbent materials of the shield, reducing the force of impact imparted on the fastener subsystem.

The exemplary tactical shield handle and lighting system also includes a power source. In some embodiments, the power source is comprised of one or more batteries that are housed in a compartment at one end of the handle assembly. This power source is electrically connected to the one or more light sources in the lighting enclosure. In some embodiments, contacts are secured to an exterior surface of the attachment blocks of the handle assembly and are electrically connected to the power source. Corresponding contacts are secured to an exterior surface of the lighting enclosure and are electrically connected to the one or more light sources. Springs are used to bridge and connect the respective contacts of the handle assembly to the corresponding contacts of the lighting enclosure. Thus, when the handle assembly and the lighting enclosure are assembled and mounted to the shield, the power source is electrically connected to the one or more light sources

DETAILED DESCRIPTION OF THE INVENTION

The present invention is a tactical shield handle and lighting system, which includes an improved fastener subsystem for securing a handle assembly and a lighting enclosure to the shield.

Figure 1:
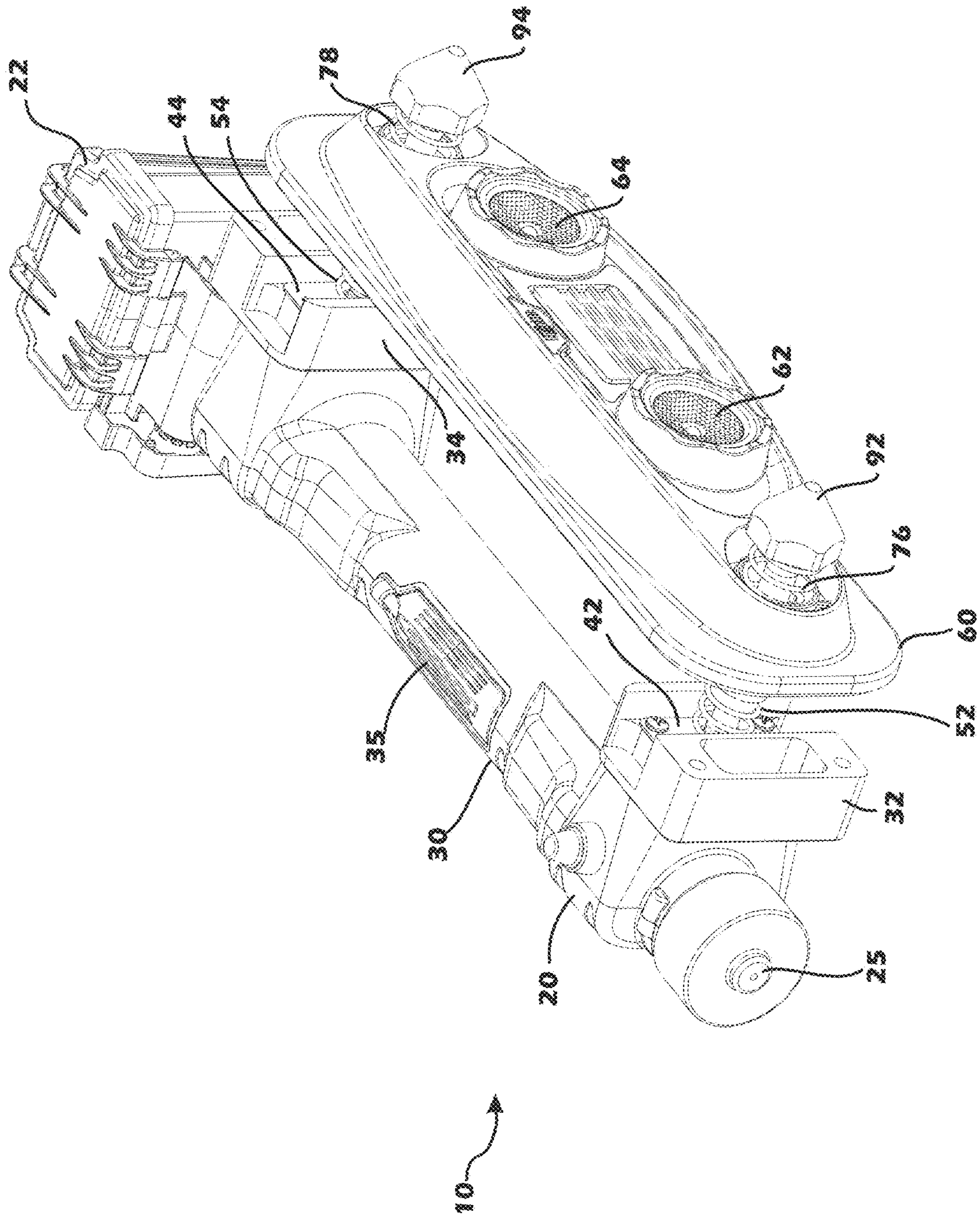
FIG. 1 is a perspective view of an exemplary tactical shield handle and lighting system made in accordance with the present invention.

FIG. 1 is a perspective view of an exemplary tactical shield handle and lighting system 10 made in accordance with the present invention.

Figure 1A:
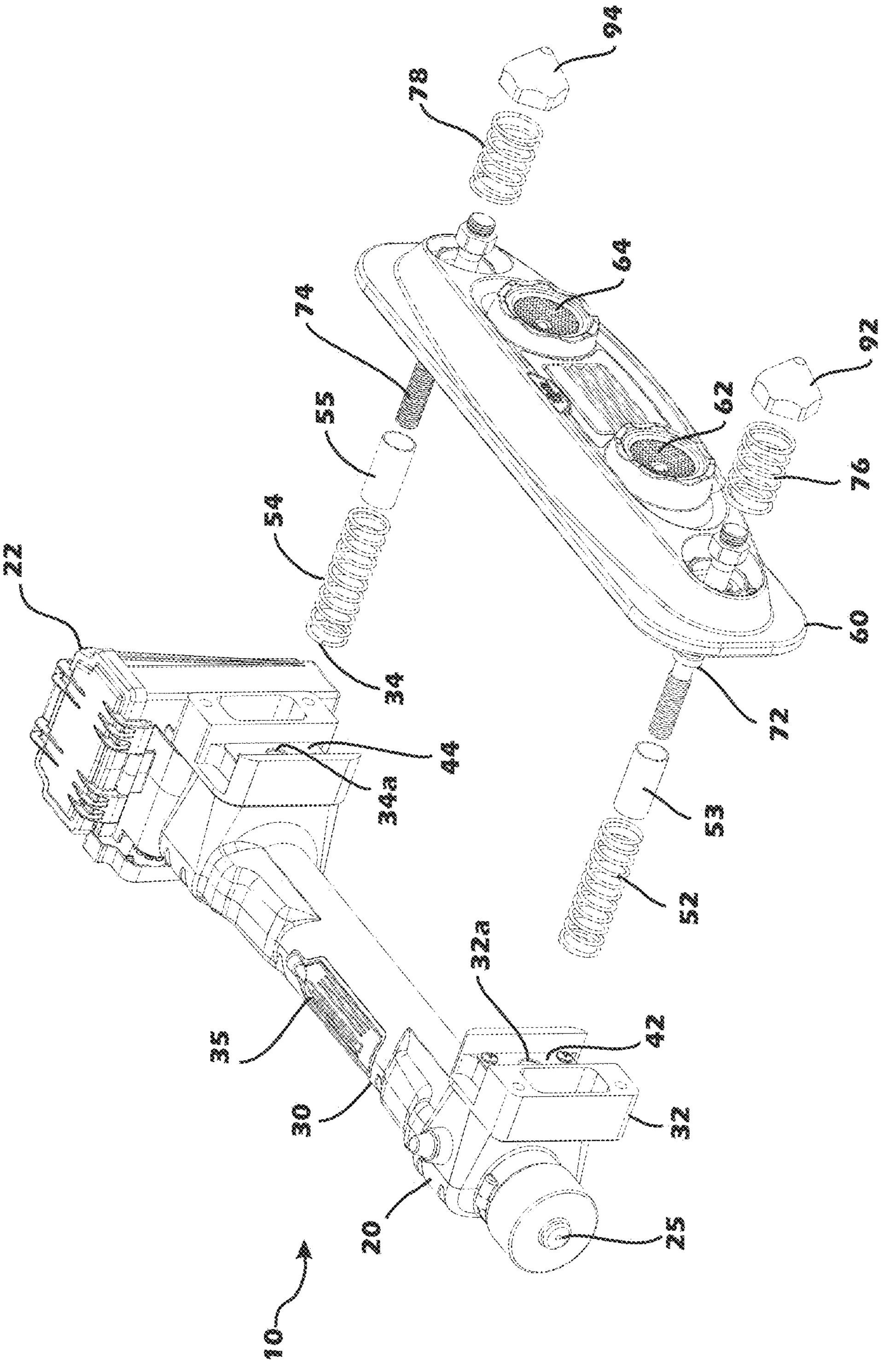
FIG. 1A is an exploded perspective view of the exemplary tactical shield handle and lighting system of FIG. 1.

FIG. 1A is an exploded perspective view of the exemplary tactical shield handle and lighting system 10 of FIG. 1.

Figure 2:
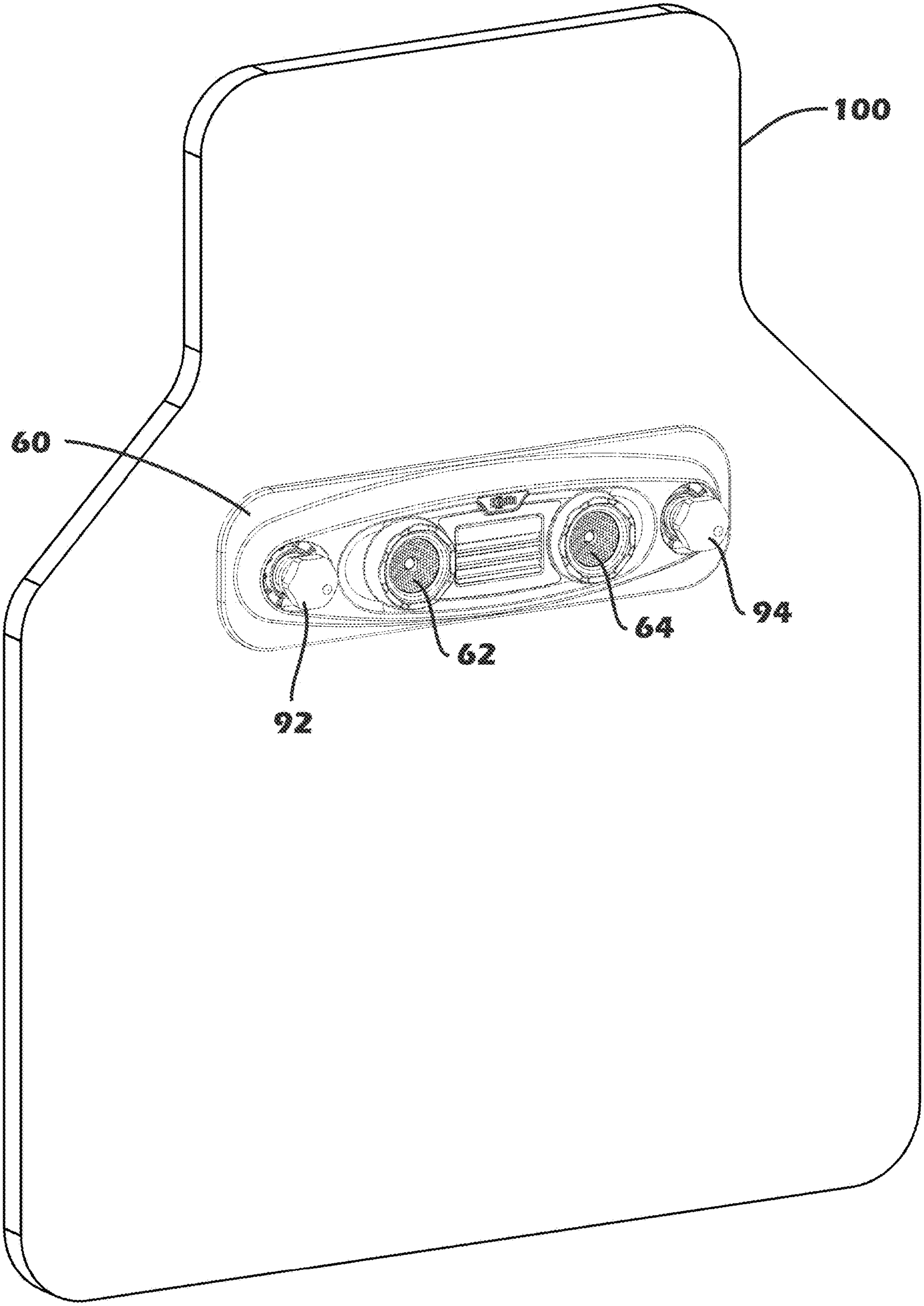
FIG. 2 is a front perspective view of a lighting enclosure of the exemplary tactical shield handle and lighting system of FIGS. 1 and 1A as mounted on a tactical shield.

FIG. 2 is a front perspective view of a lighting enclosure 60 of the exemplary tactical shield handle and lighting system 10 of FIGS. 1 and 1A as mounted on a tactical shield 100.

Figure 3:
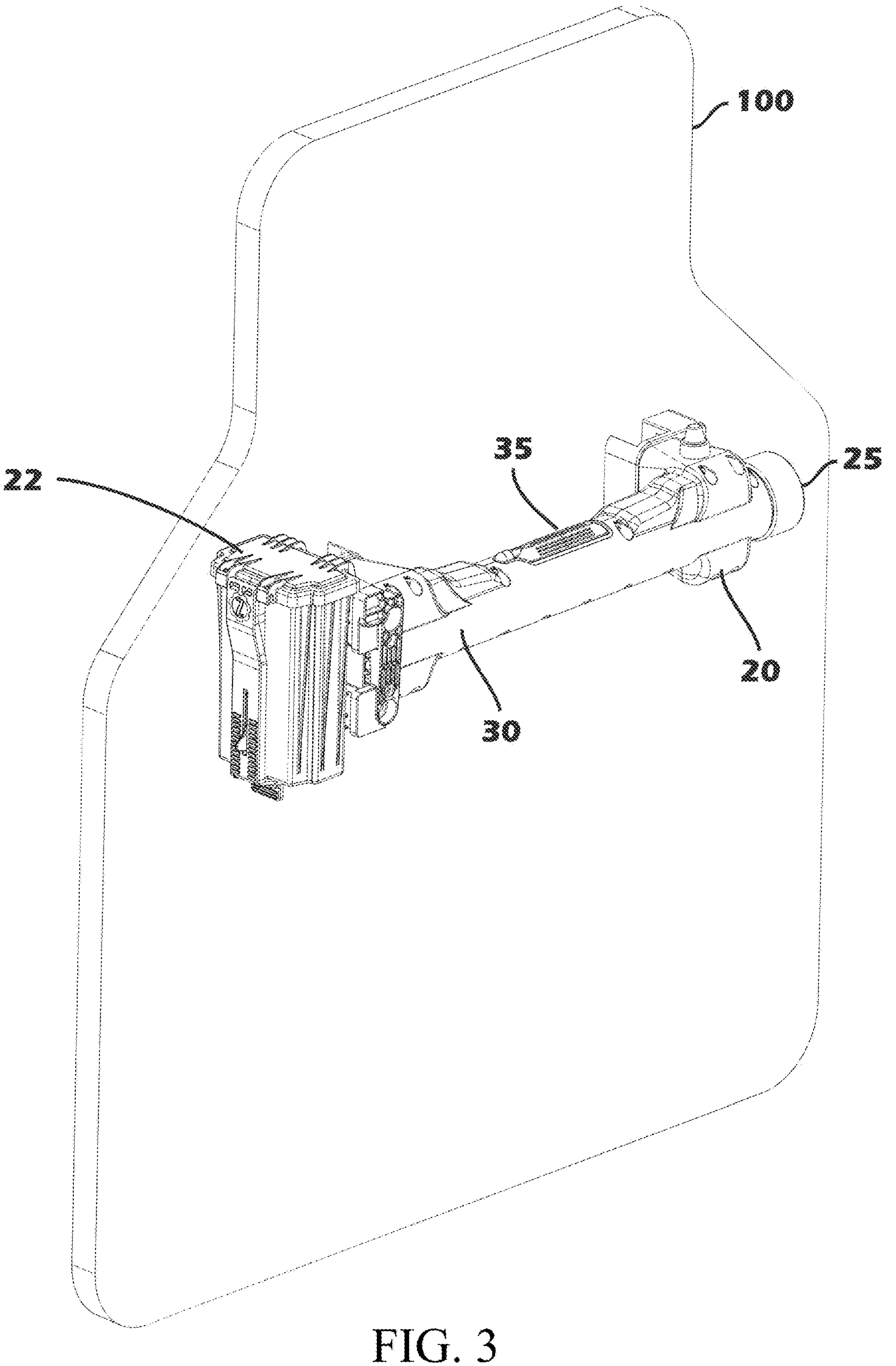
FIG. 3 is a rear perspective view of a handle assembly of the exemplary tactical shield handle and lighting system of FIGS. 1 and 1A as mounted on the tactical shield.

FIG. 3 is a rear perspective view of a handle assembly 20 of the exemplary tactical shield handle and lighting system 10 of FIGS. 1 and 1A as mounted on the tactical shield 100.

Referring now to FIGS. 1, 1A, and 3, the exemplary handle and lighting system 10 includes the handle assembly 20 that is secured to the rear surface of the tactical shield 100, with a central horizontal handle 30 configured to be gripped by an operator. The handle assembly 20 is preferably constructed of a molded polymer.

As shown in FIGS. 1, 1A, and 2, the handle and lighting system 10 also includes the lighting enclosure 60 that is secured to a front surface of the shield 100. This lighting enclosure 60 houses one or more light sources 62, 64, which, in this exemplary embodiment, are light-emitting diodes (LEDs). Furthermore, the lighting enclosure 60 is preferably constructed of a molded polymer over a fortified metal internal structure.

Referring again to FIGS. 1 and 1A, in this exemplary embodiment, two fastener posts 72, 74 are used to secure the lighting enclosure 60 to the handle assembly 20 (through the shield 100). Specifically, the handle assembly 20 includes an attachment block 32, 34 at each end of the central horizontal handle 30. Each of these attachment blocks 32, 34 is preferably constructed of machined aluminum, and each of these attachment blocks 32, 34 defines a threaded hole 32*a*, 34*a* for receiving one of the fastener posts 72, 74. Thus, each fastener post 72, 74 passes through a respective hole defined through the lighting enclosure 60, through the shield 100 (as shown in FIGS. 2 and 3), and then into the respective threaded hole 32*a*, 34*a* defined by the attachment blocks 32, 34 of the handle assembly 20.

Figure 4:
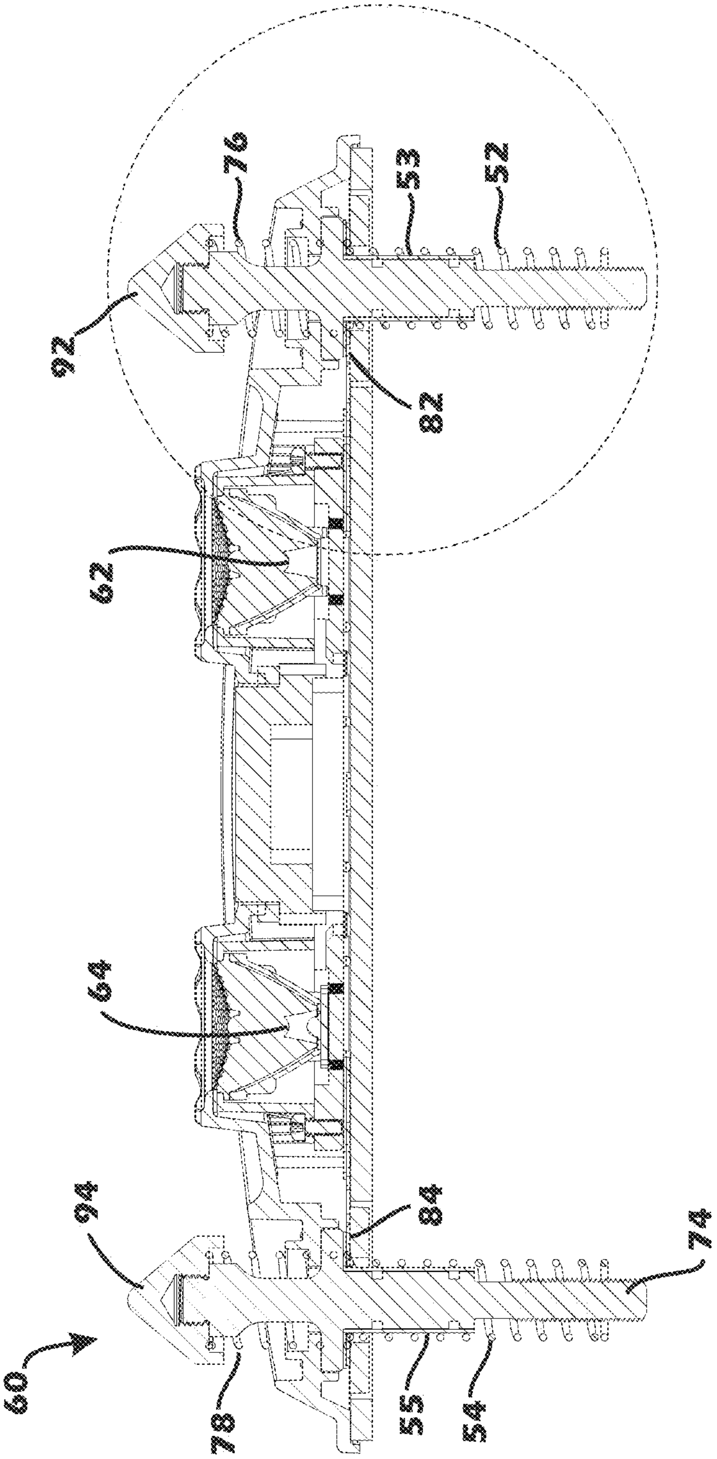
FIG. 4 is a sectional view of the lighting enclosure of FIG. 2.

FIG. 4 is a sectional view of the lighting enclosure 60.

Figure 4A:
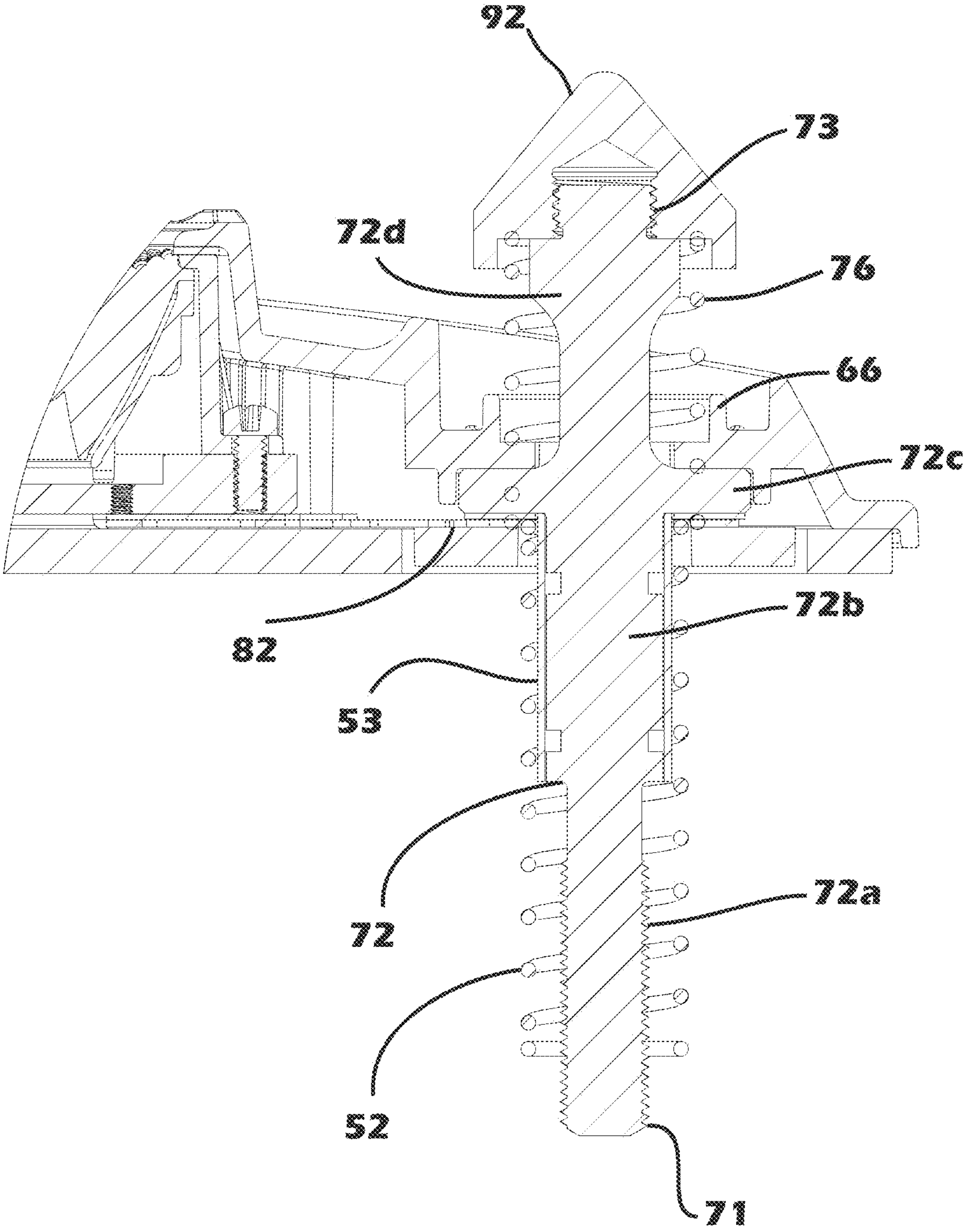
FIG. 4A is an enlarged sectional view of one of the fastener posts which is used to secure the lighting enclosure to the handle assembly of the exemplary tactical shield handle and lighting system of FIGS. 1 and 1A.

FIG. 4A is an enlarged sectional view of one of the fastener posts 72, which again is used to secure the lighting enclosure 60 to the handle assembly 20 (through the shield 100).

Referring now to FIGS. 4 and 4A, the fastener post 72 is comprised of and can be characterized as including multiple discrete sections. Specifically, in this exemplary embodiment, the fastener post 72 has a lower section 72*a* that includes a threaded end 71, which is configured to engage the threaded hole 32*a* defined by the attachment block 32 of the handle assembly 20 (as shown in FIG. 1A). A penultimate section 72*b* of the fastener post 72 is configured to extend through the shield 100 and has a larger diameter than the lower section 72*a*. A flange section 72*c* of the fastener post 72 is configured to be positioned in front of the shield 100 and has a significantly larger diameter as compared to the other sections of the fastener post 72. Finally, an upper section 72*d* of the fastener post 72 is configured to pass through the lighting enclosure 60 and includes a threaded distal end 73.

Referring still to FIGS. 4 and 4A, a ballistic deflection cone 92 is mounted to the distal threaded end 73 of the fastener post 72. In this exemplary embodiment, the ballistic deflection cone 92 is constructed of 8620 alloy steel. It is heat-treated to a 55-60 HRC to a depth of approximately 0.035 and is finished in black nitride. With respect to the mounting of the ballistic deflection cone 92, in this exemplary embodiment, the ballistic deflection cone 92 has internal threads 92*a* that correspond to and mate with the distal threaded end 73 of the upper section 72*d* of the fastener post 72, so that the ballistic deflection cone 92 can be screwed onto the upper section 72*d* of the fastener post 72.

Referring still to FIGS. 4 and 4A, a retaining spring 76 is positioned around the upper section 72*d* of the fastener post 72 and compressed between the flange section 72*c* of the fastener post 72 and the ballistic deflection cone 92. Furthermore, a molded-in centering boss 66 properly centers and positions the retaining spring 76 relative to the lighting enclosure 60.

The combination of the fastener post 72, the retaining spring 76, and the ballistic deflection cone 92 may be referred to as a fastener subsystem.

Of course, the other fastener post 74 has an identical construction, with a ballistic deflection cone 94 mounted at the distal threaded end of the fastener post 74, and with a retaining spring 78 positioned around the upper section of the fastener post 74 between the flange section of the fastener post 74 and the ballistic deflection cone 94. Thus, the combination of the fastener post 74, the retaining spring 78, and the ballistic deflection cone 94 is another fastener subsystem.

In the event of a ballistic impact, the cone-shaped surface of the ballistic deflection cone 92 (or cone 94) is designed to deflect the round into the more energy-absorbent materials of the shield 100, reducing the force of impact imparted on the fastener subsystem. Furthermore, the flange section 72*c* of the fastener post 72 (or post 74) serves as a solid mounting base, ensuring that the handle assembly 20 is rigidly fixed to the shield 100. At the same time, some limited movement of the lighting enclosure 60 relative to the shield 100 is permitted. Furthermore, the flange section 72*c* of the fastener post 72 (or post 74) provides additional ballistic protection around the periphery of the hole through the shield 100.

Figure 5:
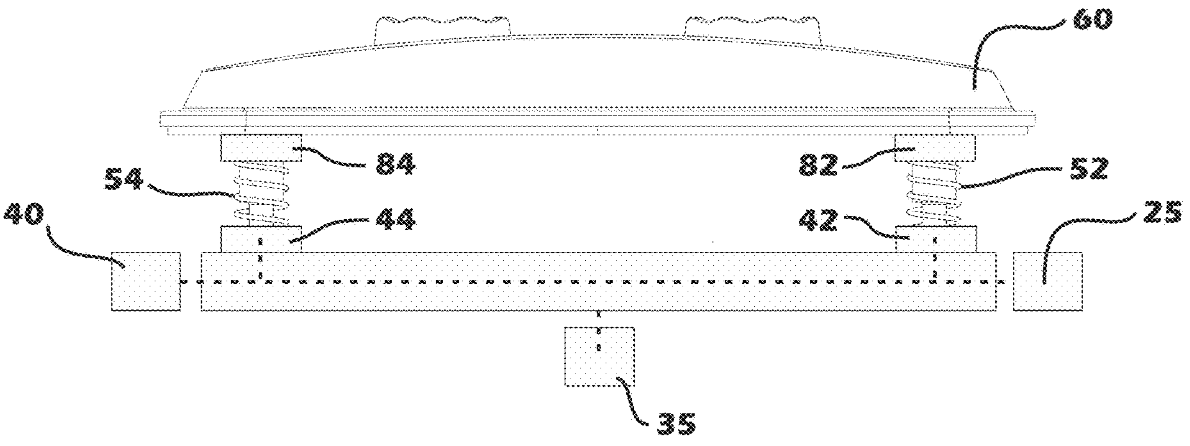
FIG. 5 is a schematic diagram of the electrical connections in the exemplary tactical shield handle and lighting system.

FIG. 5 is a schematic diagram of the electrical connections in the exemplary tactical shield handle and lighting system.

Referring now to FIGS. 1A, 4, 4A, and 5, the exemplary tactical shield handle and lighting system 10 also includes a power source 40. In this exemplary embodiment, the power source 40 is comprised of one or more batteries (not shown) that are housed in a compartment 22 at one end of the handle assembly 20. This power source 40 must be electrically connected to the one or more light sources 62, 64 in the lighting enclosure 60. In this exemplary embodiment, a first (negative) contact 42 is secured to an exterior surface of the attachment block 32 of the handle assembly 20. The power source 40 is also electrically connected to a second (positive) contact 44, which is secured to an exterior surface of the other attachment block 34 of the handle assembly 20. In this regard, the power source 40 is preferably connected to the first and second contacts 42, 44 via wires (not shown) within the handle assembly 20.

Referring now specifically to FIGS. 4, 4A, and 5, a first (negative) contact 82 is secured to one end of the lighting enclosure 60, and a second (positive) contact 84 is similarly secured to an opposite end of the lighting enclosure 60. Each of the first (negative) contact 82 and the second (positive) contact 84 are on an exterior surface of the lighting enclosure 60. Furthermore, the one or more light sources 62, 64 (e.g., LEDs) are electrically connected to the first (negative) contact 82 and the second (positive) contact 84, preferably via wires (not shown) housed within the lighting enclosure 60.

Referring again to FIGS. 1A, 4, 4A, and 5, a first spring 52 is used to bridge and connect the first (negative) contact 42 that is secured to the attachment block 32 of the handle assembly 20 to the first (negative) contact 82 that is secured to the one end of the lighting enclosure 60. Similarly, a second spring 54 is used to bridge and connect the second (positive) contact 44 that is secured to the attachment block 34 of the handle assembly 20 to the second (positive) contact 84 that is secured to the opposite end of the lighting enclosure 60. Thus, when the handle assembly 20 and the lighting enclosure 60 are assembled and mounted to the shield 100 (as shown in FIGS. 2 and 3), the power source 40 is electrically connected to the one or more light sources 62, 64. In this regard, in this exemplary embodiment, the springs 52, 54 are constructed from nickel-plated phosphor bronze. The springs 52, 54 are not only rugged means for providing the electrical connections, but the springs 52, 54 also accommodate different shield thicknesses, as they are much longer than the gap they need to bridge between the respective contacts.

As a further refinement, and as also shown in FIGS. 1A, 4, and 4A, an electrical insulator 53, 55 is positioned between each spring 52, 54 and the respective fastener post 72, 74 to ensure that the fastener posts 72, 74 are not electrically energized.

Referring again to FIGS. 1, 1A, and 5, in the exemplary embodiment described above, there is an on/off switch 25 located on the distal end of the handle assembly 20, which is integrated into the electrical circuitry, so that the switch 25 can be used to activate or deactivate the one or more light sources 62, 64.

Referring again to FIGS. 1, 1A, and 5, in the exemplary embodiment described above, there is also a pressure switch 35 along the central horizontal handle 30 of the handle assembly 20. This pressure switch 35 is also integrated into the electrical circuitry, so that operator can readily activate or deactivate the one or more light sources 62, 64 using the pressure switch 35. The construction and use of such a pressure switch 35 is detailed in U.S. Pat. Nos. 10,288,387 and 10,634,459, which have been incorporated herein by reference.

As a further refinement, although not shown in FIGS. 1-5, in some embodiments, the exemplary tactical shield handle and lighting system 10 may also include a programmable microcontroller (or integrated circuit) to facilitate the electrical connections and to allow for additional functionality, including, for example, changing the mode of operation in response to inputs from the pressure switch 35 and/or other switches. The use of such a microcontroller is also detailed in U.S. Pat. Nos. 10,288,387 and 10,634,459, which have been incorporated herein by reference.

One of ordinary skill in the art will also recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A handle and lighting system for a tactical shield, comprising:

a handle assembly configured to be mounted on a rear surface of the tactical shield; and a lighting enclosure configured to be mounted on a front surface of the tactical shield, the lighting enclosure including one or more light sources;

wherein, in use, the handle assembly is secured to the lighting enclosure through the tactical shield by one or more fastener subsystems, each of the one or more fastener subsystems including a fastener post, a ballistic deflection cone mounted to a distal end of the fastener post, and a retaining spring positioned around an upper section of the fastener post and compressed between a flange section of the fastener post and the ballistic deflection cone;

wherein the fastener post of each of the one or more fastener subsystems includes (a) a lower section that includes a threaded end, which is configured to engage the handle assembly, (b) a penultimate section that is configured to extend though the tactical shield and has a larger diameter than the lower section, (c) the flange section, which is configured to be positioned in front of the tactical shield, and (d) the upper section, which is configured to extend through the lighting enclosure and includes a threaded distal end for engaging the ballistic deflection cone.

2. The handle and lighting system as recited in claim 1, wherein the one or more light sources are light-emitting diodes.

3. The handle and lighting system as recited in claim 1, and further comprising a power source for the one or more light sources, with the power source housed in the handle assembly.

4. The handle and lighting system as recited in claim 3, wherein the power source is electrically connected to a first contact, which is positioned on an exterior surface of the handle assembly, and wherein the power source is electrically connected to a second contact, which is also positioned on an exterior surface of the handle assembly.

5. The handle and lighting system as recited in claim 4, wherein a first contact is secured to the lighting enclosure, and a second contact is secured to the lighting enclosure, with each of the first contact and the second contact electrically connected to the one or more light sources.

6. The handle and lighting system as recited in claim 5, wherein, when mounted to the tactical shield, a first spring bridges and connects the first contact positioned on the exterior surface of the handle assembly to the first contact that is secured to the lighting enclosure, and a second spring bridges and connects the second contact positioned on the exterior surface of the handle assembly to the second contact that is secured to the lighting enclosure, such that the power source is electrically connected to the one or more light sources.

7. The handle and lighting system as recited in claim 4, wherein the handle assembly includes a first attachment block at a first end and a second attachment block at a second end, each of the first and second attachment blocks defining and enclosing a threaded hole configured to receive a respective fastener post of a selected one of the one or more fastener subsystems; and wherein the first contact positioned on the exterior surface of the handle assembly is secured to the first attachment block, and wherein the second contact positioned on the exterior surface of the handle assembly is secured to the second attachment block.

8. A handle and lighting system for a tactical shield, comprising:

a handle assembly configured to be mounted on a rear surface of the tactical shield, which includes a first attachment block at a first end and a second attachment block at a second end;

a lighting enclosure configured to be mounted on a front surface of the tactical shield, the lighting enclosure including one or more light sources;

wherein, in use, the handle assembly is secured to the lighting enclosure through the tactical shield by a first fastener subsystem and a second fastener subsystem;

wherein the first fastener subsystem includes a first fastener post, which, in use, is inserted into and received by the first attachment block, a first ballistic deflection cone mounted to a distal end of the first fastener post, and a first retaining spring positioned around an upper section of the first fastener post and compressed between a flange section of the first fastener post and the first ballistic deflection cone, wherein the first fastener post includes (a) a lower section that includes a threaded end, which is configured to engage the handle assembly, (b) a penultimate section that is configured to extend though the tactical shield and has a larger diameter than the lower section, (c) the flange section, which is configured to be positioned in front of the tactical shield, and (d) the upper section, which is configured to extend through the lighting enclosure and includes a threaded distal end for engaging the ballistic deflection cone; and wherein the second fastener subsystem includes a second fastener post, which, in use, is inserted into and received by the second attachment block, a second ballistic deflection cone mounted to a distal end of the second fastener post, and a second retaining spring positioned around an upper section of the second fastener post and compressed between a flange section of the second fastener post and the second ballistic deflection cone, wherein the second fastener post includes (a) a lower section that includes a threaded end, which is configured to engage the handle assembly, (b) a penultimate section that is configured to extend though the tactical shield and has a larger diameter than the lower section, (c) the flange section, which is configured to be positioned in front of the tactical shield, and (d) the upper section, which is configured to extend through the lighting enclosure and includes a threaded distal end for engaging the ballistic deflection cone.

9. The handle and lighting system as recited in claim 8, wherein the one or more light sources are light-emitting diodes.

10. The handle and lighting system as recited in claim 8, and further comprising a power source for the one or more light sources, with the power source housed in the handle assembly.

11. The handle and lighting system as recited in claim 10, wherein the power source is electrically connected to a first contact, which is positioned on an exterior surface of the handle assembly, and wherein the power source is electrically connected to a second contact, which is also positioned on an exterior surface of the handle assembly.

12. The handle and lighting system as recited in claim 11, wherein a first contact is secured to the lighting enclosure, and a second contact is secured to the lighting enclosure, with each of the first contact and the second contact electrically connected to the one or more light sources.

13. The handle and lighting system as recited in claim 12, wherein, when mounted to the tactical shield, a first spring bridges and connects the first contact positioned on the exterior surface of the handle assembly to the first contact that is secured to the lighting enclosure, and a second spring bridges and connects the second contact positioned on the exterior surface of the handle assembly to the second contact that is secured to the lighting enclosure, such that the power source is electrically connected to the one or more light sources.

14. The handle and lighting system as recited in claim 13, wherein the first contact positioned on the exterior surface of the handle assembly is secured to the first attachment block, and wherein the second contact positioned on the exterior surface of the handle assembly is secured to the second attachment block.

15. A handle and lighting system for a tactical shield, comprising:

a handle assembly configured to be mounted on a rear surface of the tactical shield; and a lighting enclosure configured to be mounted on a front surface of the tactical shield, the lighting enclosure including one or more light sources;

wherein, in use, the handle assembly is secured to the lighting enclosure through the tactical shield by one or more fastener subsystems, each of the one or more fastener subsystems including a fastener post extending through the tactical shield, including a lower section with a threaded end engaging the handle assembly, a flange section positioned in front of the shield, and an upper section extending through the lighting enclosure and including a threaded distal end, a ballistic deflection cone mounted to the distal end of the fastener post, and a retaining spring positioned around the fastener post and compressed between the flange section of the fastener post and the ballistic deflection cone.

16. The handle and lighting system as recited in claim 15, wherein the one or more light sources are light-emitting diodes.

17. The handle and lighting system as recited in claim 15, and further comprising a power source for the one or more light sources, with the power source housed in the handle assembly.

18. The handle and lighting system as recited in claim 17, wherein the power source is electrically connected to a first contact, which is positioned on an exterior surface of the handle assembly, and wherein the power source is electrically connected to a second contact, which is also positioned on an exterior surface of the handle assembly.

19. The handle and lighting system as recited in claim 18, wherein a first contact is secured to the lighting enclosure, and a second contact is secured to the lighting enclosure, with each of the first contact and the second contact electrically connected to the one or more light sources.

20. The handle and lighting system as recited in claim 19, wherein, when mounted to the tactical shield, a first spring bridges and connects the first contact positioned on the exterior surface of the handle assembly to the first contact that is secured to the lighting enclosure, and a second spring bridges and connects the second contact positioned on the exterior surface of the handle assembly to the second contact that is secured to the lighting enclosure, such that the power source is electrically connected to the one or more light sources.

* * * * *